United States Patent [19]

Zahn et al.

[11] Patent Number: 5,775,560

[45] Date of Patent: Jul. 7, 1998

[54] MULTI-FUNCTIONAL, HITCH MOUNTED CARRYING APPARATUS

[75] Inventors: James B. Zahn, Midland; Paul B. Knight, Kawkawlin; Larry D. Zahn, Davisburg, all of Mich.

[73] Assignee: Hosco Incorporated, Kawkawlin, Mich.

[21] Appl. No.: 801,745

[22] Filed: Feb. 18, 1997

Related U.S. Application Data

[60] Provisional application No. 60/012,083 Feb. 22, 1996.

[51] Int. Cl.$^6$ ............................... B60R 9/06; B60R 9/10; B60R 9/055
[52] U.S. Cl. .............. 224/524; 224/506; 224/519; 224/533; 224/485
[58] Field of Search ..................... 224/282, 488, 224/495, 502, 504, 505, 506, 507, 518, 519, 520, 521, 523, 524, 525, 526, 527, 924, 533, 537, 531, 532; 280/491.5

[56] References Cited

U.S. PATENT DOCUMENTS

| | | |
|---|---|---|
| D. 343,151 | 1/1994 | Eckhart . |
| 1,718,205 | 6/1929 | McNear ......................... 224/524 |
| 1,976,146 | 10/1934 | Self ............................... 224/524 |
| 2,916,302 | 12/1959 | Lippitt ........................ 280/491.5 |
| 3,913,811 | 10/1975 | Spencer ........................ 224/508 |
| 4,099,760 | 7/1978 | Mascotte et al. ............ 224/507 |
| 4,744,590 | 5/1988 | Chesney ...................... 224/520 |
| 4,813,584 | 3/1989 | Wiley . |
| 4,844,528 | 7/1989 | Johnson . |
| 4,915,276 | 4/1990 | Devito . |
| 4,938,399 | 7/1990 | Hull et al. . |
| 4,957,228 | 9/1990 | Balka . |
| 5,018,651 | 5/1991 | Huli et al. . |
| 5,033,662 | 7/1991 | Godin . |
| 5,038,983 | 8/1991 | Tomososki . |
| 5,096,102 | 3/1992 | Tolson . |
| 5,106,002 | 4/1992 | Smith et al. . |
| 5,181,822 | 1/1993 | Allsop et al. . |
| 5,190,195 | 3/1993 | Fullhart et al. . |
| 5,199,842 | 4/1993 | Watt et al. . |

(List continued on next page.)

FOREIGN PATENT DOCUMENTS

| | | | |
|---|---|---|---|
| 679638 A | 4/1930 | France | ..................... 224/527 |
| 701997 | 3/1931 | France | ..................... 224/524 |
| 2686051 | 7/1993 | France | ..................... 224/520 |
| 2689468 | 10/1993 | France | ..................... 224/924 |

OTHER PUBLICATIONS

Phamplet for Master Mount by Amerian Specialties, 2 pgs. (Applicants are not sure if this is priort art).

*Primary Examiner*—Henry J. Recla
*Assistant Examiner*—Gregory M. Vidovich
*Attorney, Agent, or Firm*—Emch, Schaffer, Schaub & Porcello, Co., L.P.A.

[57] ABSTRACT

A multi-functional carrier apparatus or system which attaches to a vehicle via a standard receiver trailer hitch or a step-bumper hitch. The apparatus consisting of: (a) a hitch member that is pinned/attached to the standard hitch of a vehicle, (b) a support frame or mounting platform, and (c) any number of removable carrying accessories which are made 10 to easily and quickly secure to the support frame. The purpose of the hitch member is to secure the mounting support-frame to the vehicle while locating it up from the hitch and rearward of the vehicle bumper. The pivotable support-frame permits quick and secure attachment of the cargo carrying accessories. The mounting support-frame is adjustable to permit positioning it from parallel to perpendicular with the ground to handle a number of carrying accessories. The removable carrying accessories of the system are easy to attach and secure to the support frame. Examples of these carrying accessories include, but are not limited to: (a) enclosed cargo container, (b) animal transport kennel, (c) hauling deck, (d) bicycle rack, (e) ski rack and (f) spare tire holder.

12 Claims, 7 Drawing Sheets

U.S. PATENT DOCUMENTS

| | | |
|---|---|---|
| 5,215,234 | 6/1993 | Pasley . |
| 5,232,134 | 8/1993 | Allen . |
| 5,269,446 | 12/1993 | Biehn . |
| 5,303,857 | 4/1994 | Hewson . |
| 5,310,100 | 5/1994 | Liscinsky . |
| 5,330,084 | 7/1994 | Peters ..................... 224/924 |
| 5,427,289 | 6/1995 | Ostor ..................... 224/282 |
| 5,439,151 | 8/1995 | Clayton ..................... 224/282 |
| 5,460,304 | 10/1995 | Porter et al. ..................... 224/521 |
| 5,482,424 | 1/1996 | Jones et al. ..................... 224/521 |
| 5,497,927 | 3/1996 | Peterson ..................... 224/519 |
| 5,676,292 | 10/1997 | Miller ..................... 224/524 |

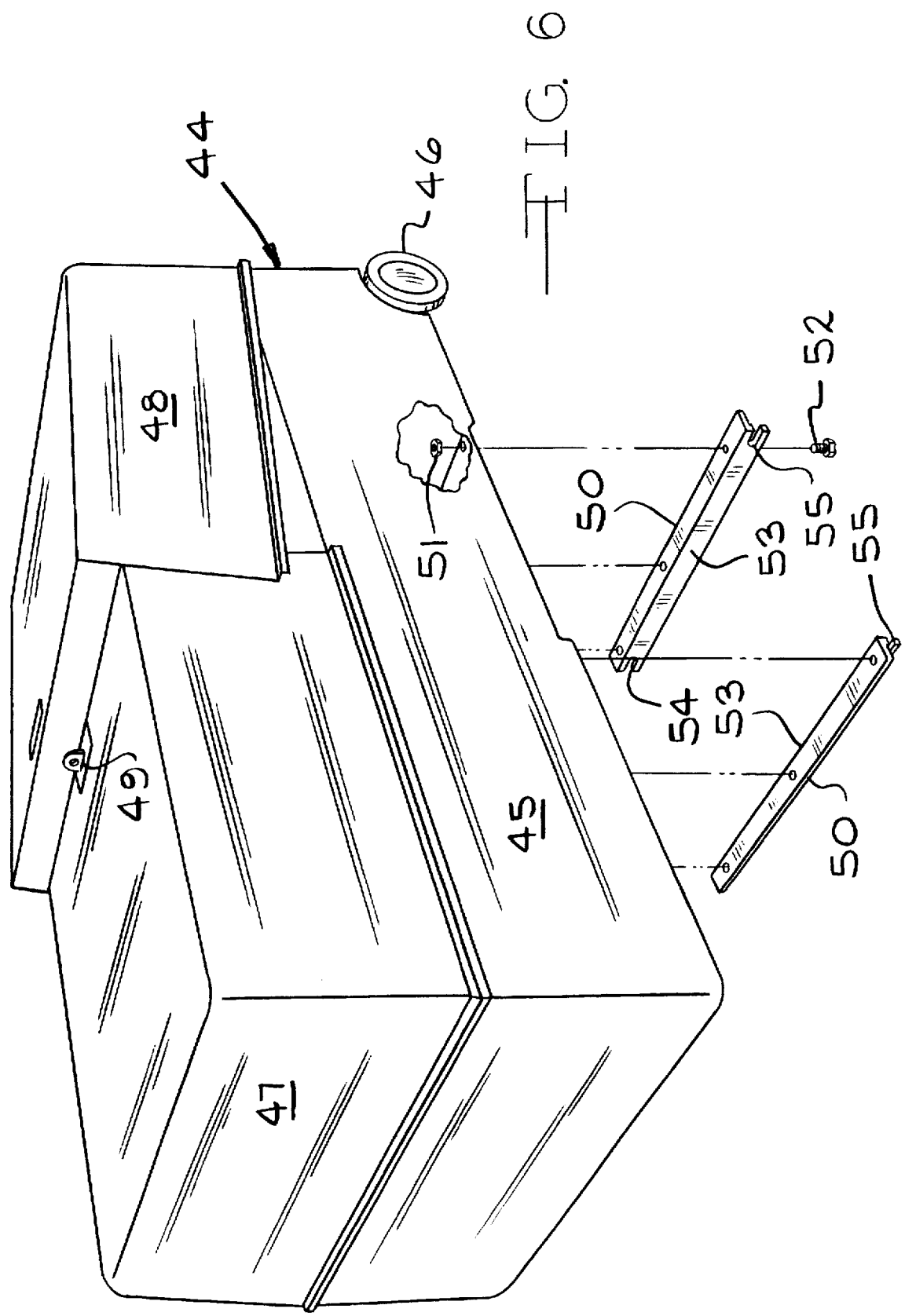

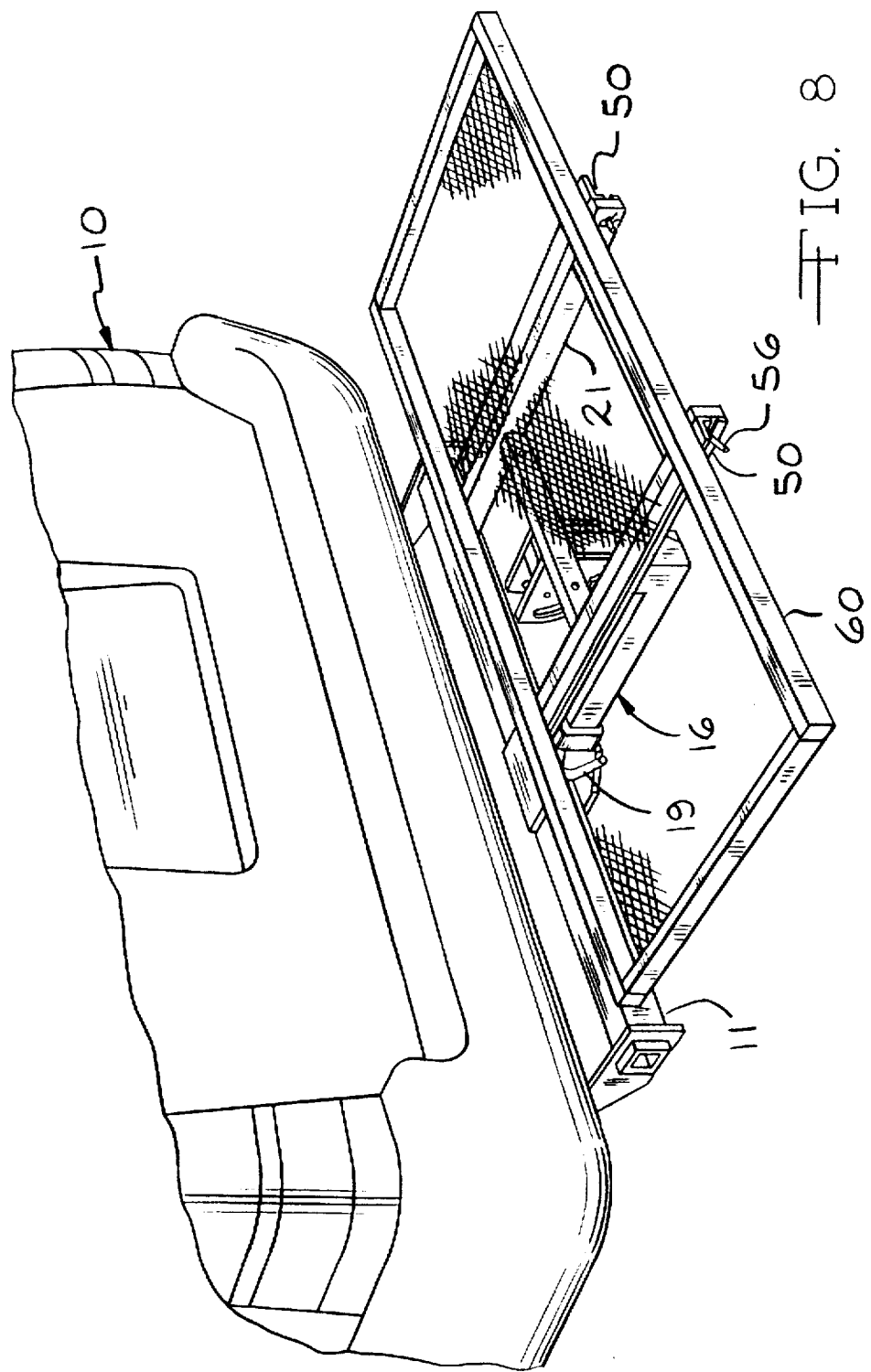

MULTI-FUNCTIONAL, HITCH MOUNTED CARRYING APPARATUS

CROSS-REFERENCE TO RELATED APPLICATIONS

The present application is related to Provisional Application Serial No. 60/012,083 filed Feb. 22, 1996.

BACKGROUND OF THE INVENTION

Apparatus for attachment to vehicle hitches for the purpose of carrying many specific types of cargo are known in the prior art. Many prior art apparatus are trailer-like devices which have ground engaging wheels for carrying the load applied to the device. These trailers are attached to the motor vehicle by means of a trailer hitch or receiver mounted under the vehicle bumper, or are attached to the lower portion of the vehicle bumper. Another type of prior art apparatus attaches to the vehicle trailer hitch and utilizes the vehicle suspension and an integral hitch structure to carry the cargo load without the use of separate ground engaging wheels.

While these prior art devices serve their specific design functions, they have disadvantages. The first and foremost disadvantage to these devices is that they have singularity of purpose. That is, they are designed for a highly specific task. They are tightly constrained as to their construction and form so as to render them useless except for their designed task. The main second disadvantage is that these devices are cumbersome and difficult to attach to the vehicle. Most require several people to align and attach to the vehicle. They sometimes require crawling under the device to secure it to the vehicle.

The carrier disclosed by Liscinsky in U.S. Pat. No. 5,310,100 is mounted to both the vehicle hitch, as well as its bumper. It has an enclosed cargo box which has a complicated mounting system, permanently attached to the box. Its secondary function, that of a table, is achieved via a rearward displacement of the cargo box assemblage. The permanently attached box and mounting system is difficult to properly adjust and install on a specific vehicle.

Another cargo carrying device is disclosed by Tomososki in U.S. Pat. No. 5,038,983. It is an enclosed cargo box with a permanently attached hitch engaging member which is both cumbersome and difficult to install into proper position. It appears to require crawling under the assemblage to secure the unit to the vehicle. The assembly appears to have a single purpose.

Another type of device, an open-topped cargo carrying device, is disclosed by Hull in U.S. Pat. No. 5,018,651. Hull discloses a dumping device which mounts to the vehicle hitch and performs its single purpose by tilting on a hinged end of a T-section.

Further, in the family of prior art tilting/dumping devices, a wide variety of single purpose baskets are shown in U.S. Pat. No. 5,106,002 which pivot not as a primary function of the devices, but solely as a means of access to the hauling vehicle.

A device which seeks to address the drawback of singularity of purpose is disclosed in U.S. Pat. No. 4,813,584 which reveals a fixed position platform which carries several types of cargo by means of moveable load-bearing members within a fixed perimeter frame.

SUMMARY OF THE INVENTION

The invention relates to a multi-functional hitch mounted carrier apparatus or system which is detachably secured to a standard vehicle hitch and carries a variety of loads without ground engaging wheels. This carrier apparatus includes a multi-positional support platform or mounting platform which has a wide variety of specific cargo carrying accessories interchangeably attachable thereto. The carrying devices are easily mounted to the multi-positional support platform. The carrier apparatus has the advantage of light weight along with the advantage of having a single, common vehicle attachment piece. It has the flexibility of having a wide variety of cargo-specific devices attachable, dependent on the task immediately at hand.

The primary objectives of this invention are to 1) provide a hitch mounted, multi-functional carrying apparatus for motor vehicles having a standard receiver-type or a bumper-type hitch, which utilizes a multipositional support frame which permits various cargo carrying devices or accessories to be quickly and easily secured; and 2) an improved hitch mounted carrier which is easier to secure and remove from a vehicle's standard hitch.

The present invention relates to a multi-functional, hitch mounted carrying apparatus for vehicles. The apparatus has maximized ease to use; ease of manufacture; and the strength to weight ratio while minimizing the cost to produce. The apparatus consists of a) hitch member that is attached to the vehicle's standard hitch, b) a support frame for the mounting of carrying accessories, and c) several carrying accessories for use with the system.

The purpose of the hitch member or component is to secure the support frame to the vehicle via a square hitch receiver, while locating it up from the hitch and rearward of the vehicle bumper. The spatial position of the support frame insures proper ground clearance and safe operation of the vehicle while the carrier and its accessories are attached. The hitch member is constructed of square tubing and preferably has an "L-shape." It has holes for securing to the vehicle's square hitch receiver and holes for connecting it to the multi-positional support frame.

The purpose of the multi-positional support frame is to provide support and the means for quick and secure attachment of cargo carrying accessories. It has been designed to be light weight and strong. The preferred embodiment of the multi-positional support frame consists of a generally rectangular shaped frame made by welding rectangular steel tubing together. Attachment holes are punched or drilled into the tubing frame. Strategically placed pin-type projections permit the attachment of the carrying accessories. The multi-positional support frame has also been made adjustable to permit positioning it from parallel to perpendicular with the ground. The specific positions are selectable by means of a removable positioning pin. This is accomplished for example, by using hinge plates that are welded to the support frame. Bolts or pins secure these plates to the hitch member. The support frame position is changed by removing a positioning pin; adjusting the support frame; and replacing the positioning pin.

There are two preferred attachment methods for the mounting of carrying accessories to the multi-functional base assembly. The first-type of attachment is a pair of "angle-shaped" brackets having slots on both ends, which slide along the outside of the support frame. These brackets slide outside the rectangular tubing base and are passively secured to the support frame in two dimensions by pin-type projections emanating from the sides of the support frame engaging slots in the bracket. Slots in the opposite end of the brackets permit securing the brackets to the multi20 functional support frame by using removable pins. The second type of attachment brackets are fabricated metal brackets which are secured to holes in a transverse cross member of the support frame. These brackets can be positioned alongside, over, or adjacent to the holes in the transverse cross member of the support frame. Holes that are punched or drilled in this bracket permit it to be secured to the support frame, once again, using removable pins or bolts.

The removable carrying accessories of the system are permanently attached to the appropriate attachment brackets to permit easy, quick and secure attachment of the accessories to the support frame. Examples of the carrying accessories intended for use with the support frame in the down or horizontal position include, but are not limited to:

a) enclosed cargo container, b) animal transport kennel, c) hauling deck, and d) bicycle deck. Examples of carrying accessories for the support frame in the up or vertical position include, but are not limited to: a) ski rack, b) bicycle rack, and c) spare tire carrier. The design of a multiposition support frame and the simplicity of the preferred attachment brackets or adapter pieces permits many more carrying accessories, some of which may already exist, to become part of the system.

This invention provides a fundamental improvement in the ergonomics of current hitch mounted, carrying devices. By utilizing a component structure, the weight of the hitch mounted carrying device is split into two stages. This makes moving and installing the carrier easier to accomplish. Additionally, the component structure of the invention provides maximum access to the vehicle's receiver or bumper hitch to secure it to the vehicle. This is especially important when the carrying accessory is an enclosed cargo container or another such bulky carrying accessory. Many existing devices require the user to crawl under the vehicle/carrying device to secure it to the hitch or the cargo container to be positioned far from the bumper to permit access to the hitch. The latter approach makes operating the vehicle with the hitch device in place more difficult and less safe. Finally, the component design of the invention improves the storage of the device. No tools are needed to disassemble the carrying apparatus into components which can be easily removed from the vehicle and conveniently stored.

This invention also provides for a multi-functional carrying apparatus for use by vehicles with a standard square receiver or bumper hitch. The multi-functional carrying apparatus was designed using fundamental mechanics to provide maximum strength while minimizing weight. Its square tubular design provides flat surfaces for the mounting of carrying accessories. Standardized brackets attached to the carrying accessories utilize interlocking features to passively secure the accessories in two dimensions. Positive (on or off) securing of the carrying accessory in the third dimension to the structural base assembly is accomplished with easy to use removable pins. The adjustable nature of the support frame improves the functionality of the apparatus by permitting a wider variety of carrying accessories to be attached. It also allows the carrying apparatus to be lifted up and out of the way when not in use.

BRIEF DESCRIPTION OF THE DRAWINGS

FIG. 2A is an enlarged cross-sectional view taken along the line 2A—2A of FIG. 2;

FIG. 6 is an exploded perspective view of a cargo box with attachment brackets being shown;

FIG. 8 is a perspective view of a cargo deck accessory mounted on the multi-functional hitch mounted carrying apparatus.

DESCRIPTION OF THE PREFERRED EMBODIMENTS

Figure 1:
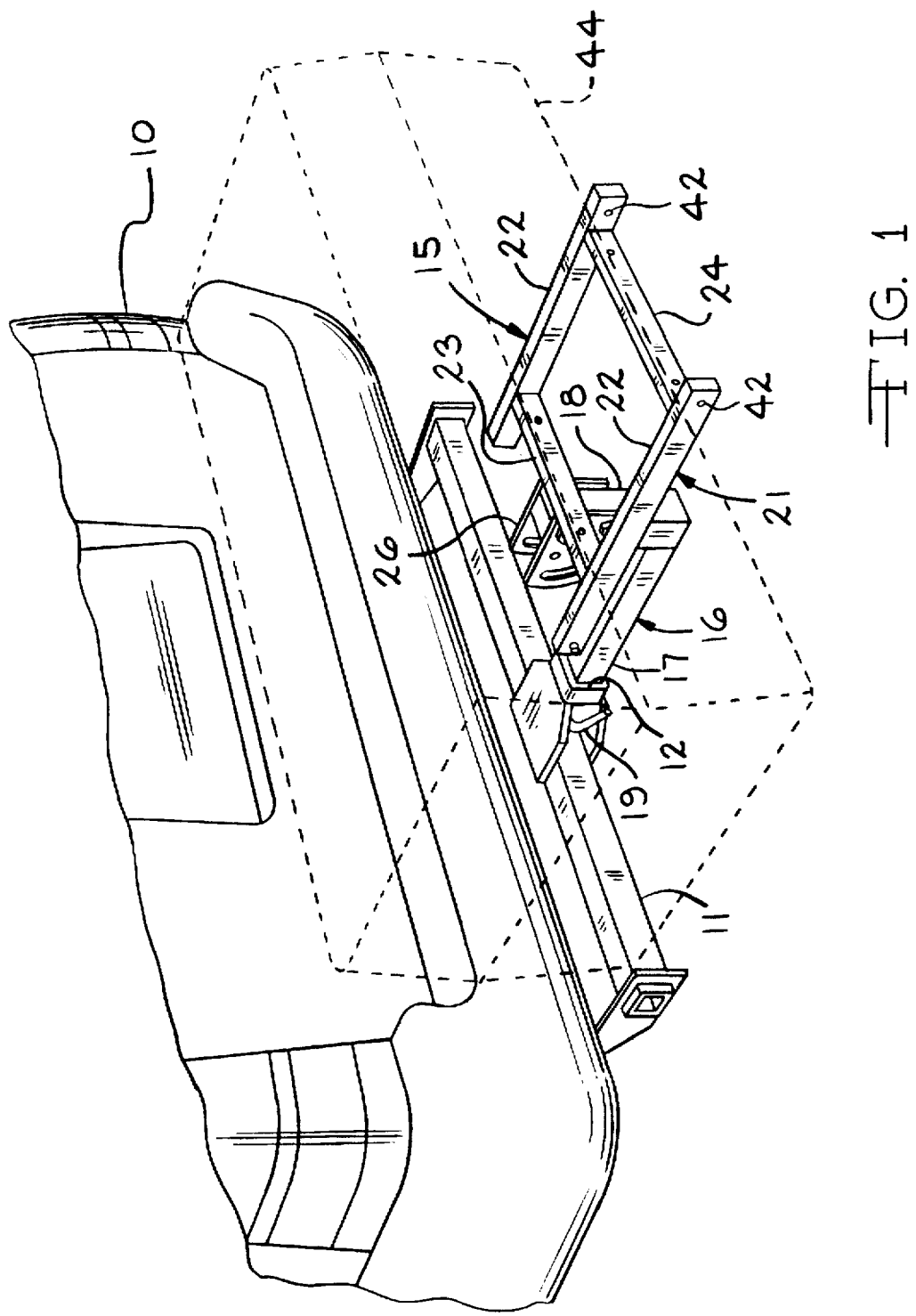
FIG. 1 is a perspective view of the multi-functional hitch mounted carrying apparatus, according to the present invention, in the horizontal position with a box-type cargo carrying device shown in phantom.

Referring to FIG. 1, the rear end of a vehicle 10 includes a hitch assembly 11 having a standard receiver 12.

A multi-functional hitch mounted carrying apparatus, according to the present invention, is generally indicated by the reference number 15. The carrying apparatus 15 includes an "L-shaped" hitch member 16 having a first leg 17 and a perpendicular second leg 18. In the present embodiment, the hitch member 16 has a rectangular or square crosssection and the first leg 17 is positioned within the standard receiver 12 of the vehicle hitch assembly 11. A standard removable hitch pin 19 secures the first leg 17 to the vehicle hitch assembly 11. The multifunctional hitch mounted carrying apparatus 15 also includes a support frame 21. In the present embodiment, the support frame 21 includes a pair of parallel longitudinal members 22 and a pair of transverse cross1 members 23 and 24. It has been found that rectangular or square steel tubing is a preferable material for constructing the longitudinal members 22 and the cross members 23 and 24.

Figure 4:
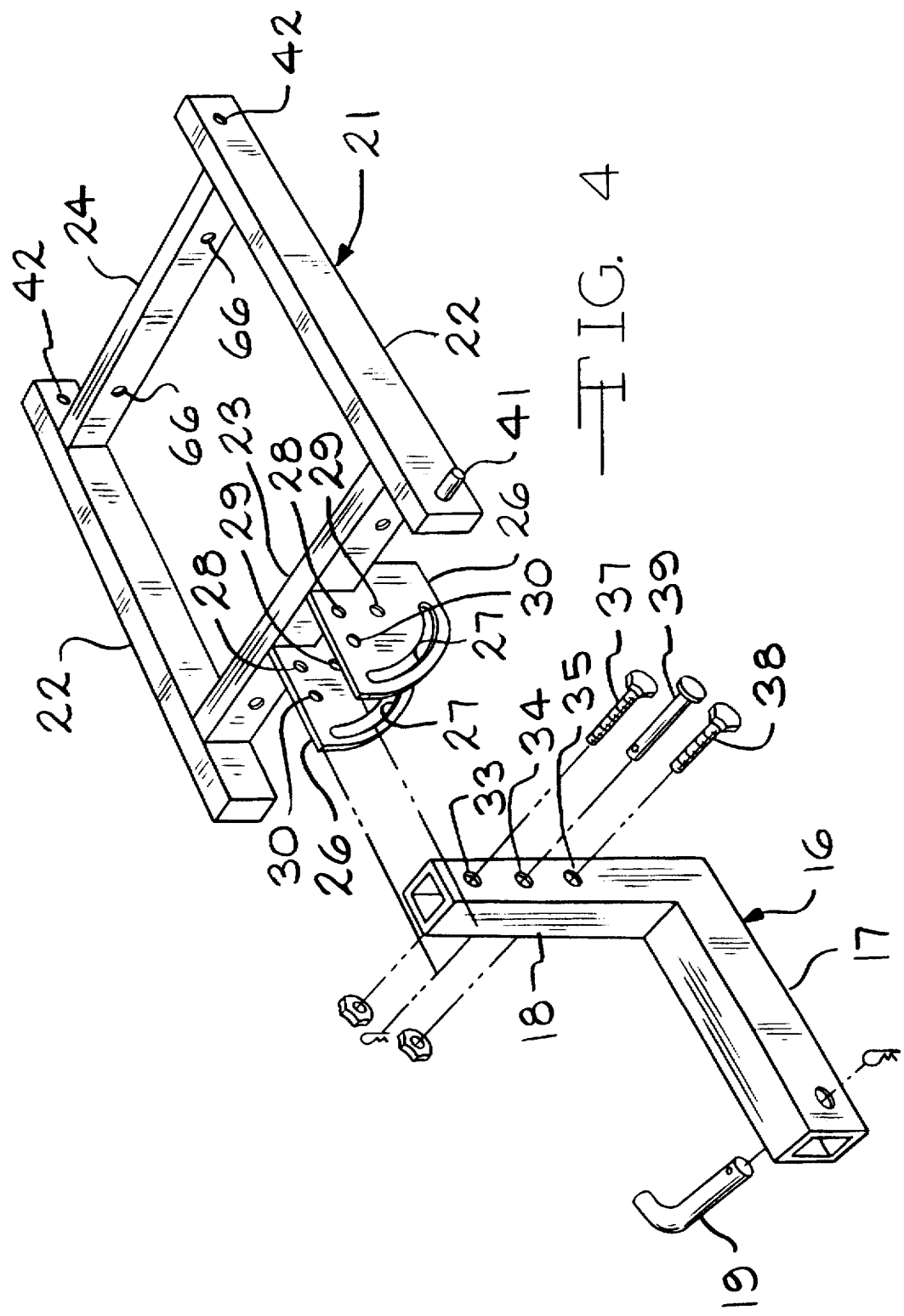
FIG. 4 is an exploded view of the multi-functional hitch mounted carrying apparatus, according to the present invention.

Referring to FIG. 4, parallel hinge plates 26 are welded to the transverse cross member 23. The spacing between the hinge plates 26 is just wide enough to permit the opening to receive the upper end of the second leg 18 of the hitch member 16. Referring to FIG. 4, the guide plates 26 define a pair of arcuate guide slots 27 and three pairs of aligned openings 28, 29 and 30.

Figure 2:
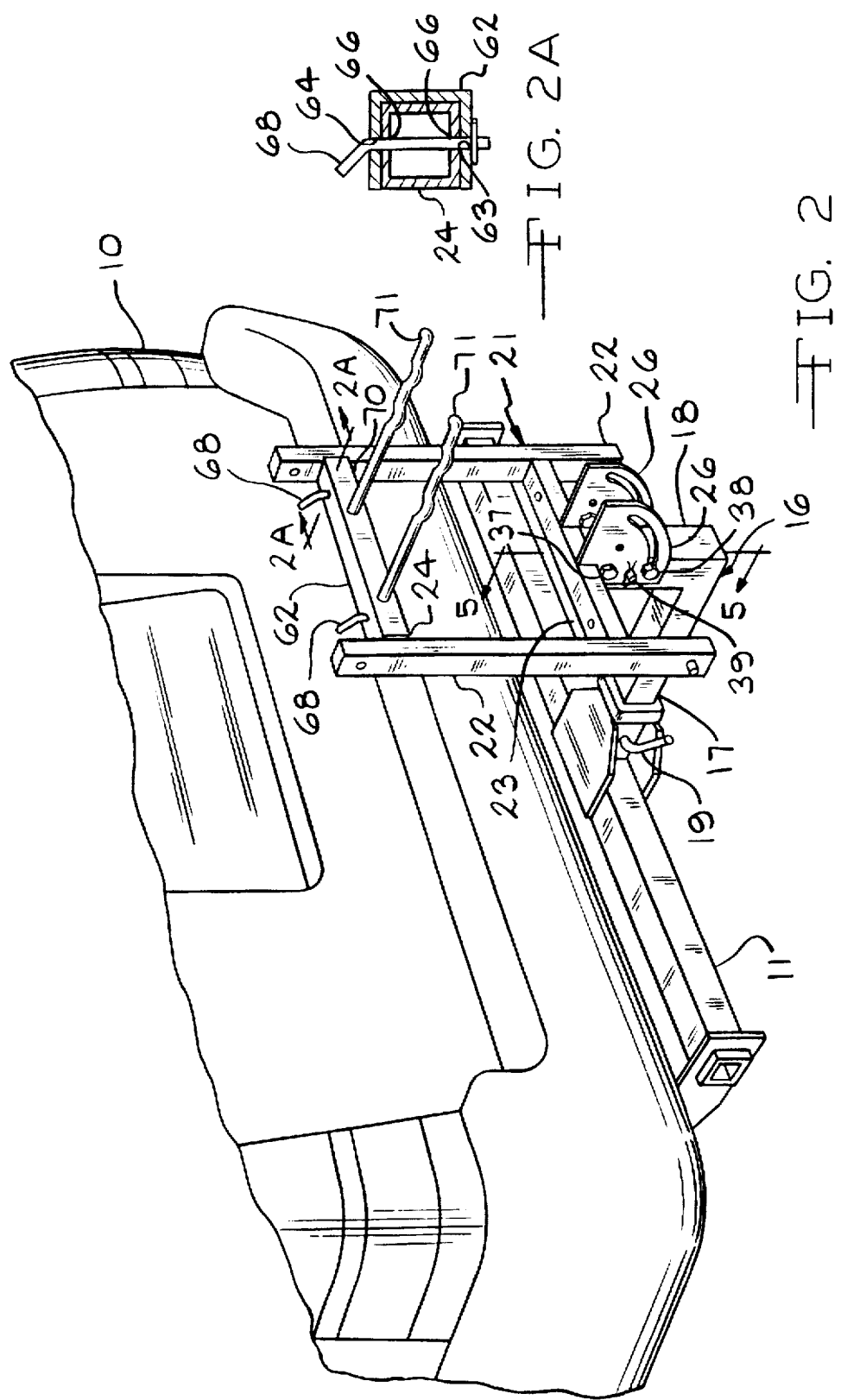
FIG. 2 is a perspective view of the multi-functional hitch mounted carrying apparatus in the vertical position with a bicycle-type carrying device mounted.
Figure 3:
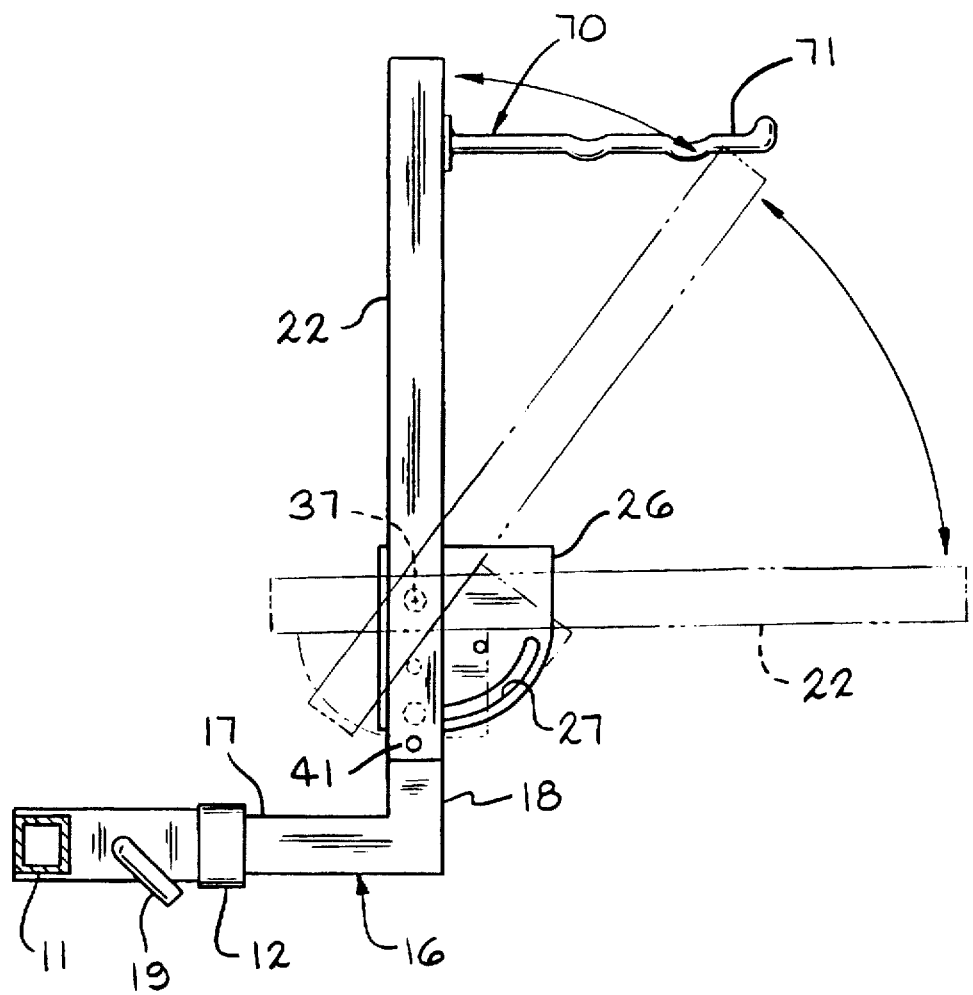
FIG. 3 is a side view of the multi-functional hitch mounted carrying apparatus in the vertical position and showing the horizontal position in phantom.

The second leg 18 of the hitch member 1 6 defines spaced openings 33, 34 and 35. After the second leg 18 is positioned between the spaced hinge plates 26, the openings 28 and 33 are aligned and receive a pivot pin 37. Similarly, the arcuate guide slots 27 are aligned with the openings 35 and receive a guide pin 38. When the support frame 21 is in the horizontal position indicated in FIG. 4, the support frame or mounting platform 21 is pivotally movable on the pivot pin 37, with its movement being guided by the guide pin 38 moving along the arcuate guide paths 27. If it is desired for the support frame 21 to remain in the horizontal position, the holes 29 in the hinge plates 26 are aligned with the openings 34 in the second leg 1 8 and a locking pin 39 is inserted. If a vertical position is desired, as indicated in FIG. 2, the support frame 21 is moved to the vertical position shown in FIG. 2 and the openings 30 in the hinge plates 26 are aligned with the openings 34 in the second leg 18. The locking pin 39 is then inserted in the openings 30 and 34 to secure the support frame 21 in the FIG. 2 vertical position.

In a normal situation, the first leg 17 and second leg 18 of the hitch member 16 are constructed of two inch square tubing for attachment to a standard two inch receiver 12. In another embodiment, the horizontal first leg 17 is constructed of 1¼ inch square tubing for smaller vehicle hitch receivers. For vehicles having a step-bumper style hitch, there are a variety of commercially available products that attach a square receiver to the step-bumper style hitch. These prior art hitch products permit the attachment of the hitch member 16 of the present multi-functional hitch mounted carrying apparatus 15 to the vehicle.

While it is preferable to have the support frame 21 pivot with respect to the hitch member 16 between a horizontal position and a vertical position, in another embodiment (not shown) the support frame 21 is welded directly to the second leg 18 of the hitch member 16 in either a fixed horizontal position or a fixed vertical position. In this embodiment, the hinge plates 26, which are used for pivoting are eliminated.

The arcuate guide paths or slots 27 which are defined by the hinge plates 26 automatically stop the rotation of the support frame 21 in either the vertical or horizontal position, thereby allowing for ease of insertion of the locking pin 39.

A multi-positional support frame 21, as shown in FIGS. 1 and 4, is preferred over a fixed support frame. A wider variety of carrying accessories can be attached to the support frame 21 if it can be located in either vertical or horizontal positions. Secondly, the vertical position of the support frame 21 results in a carrying apparatus which is closer to the vehicle and thus out of the way when not in use. It can also be quickly rotated downwardly to gain access to the rear cargo opening of the vehicle. This allows the multi-functional hitch mounted carrying apparatus 15 to be left attached to the vehicle hitch assembly 11 when not in use.

One major advantage of the present multi-functional hitch mounted carrying apparatus 15 is that the second leg 18 of the hitch member 16 moves the support frame 21 upwardly when in the horizontal position. This allows the operator to rotate the support frame 21 and insert the pins 39 and 19 without crawling under the vehicle. This is also a great advantage when various types of carrying accessories are mounted on the support frame 21.

In a preferred embodiment, a pair of retainer pins 41 extend outwardly from the ends of the longitudinal members 22 of the support frame 21. A pair of openings 42 are defined in the longitudinal members 22 at their other ends. One of the carrying accessories is an enclosed waterproof container 44 which is indicated in FIG. 1 and is shown in detail in FIG. 6. The container 44 includes a bottom portion 45 having wheels 46 mounted at one end. Cover portions 47 and 48 are hinged to the bottom portion 45. A latch assembly 49 secures the cover portions 47 and 48 when in the closed position. A pair of angle brackets 50 are secured to the bottom of the bottom portion 45 of the container 44 by a plurality of nuts 51 and bolts 52. The brackets 50 are secured such that their vertical faces 53 are facing each other in parallel alignments and are positioned approximately ¼ inch wider than the parallel longitudinal members 22 of the support frame 21. The faces 53 of the angle brackets 50 define longitudinal slots 54 and 55 at their opposed ends.

Figure 7:
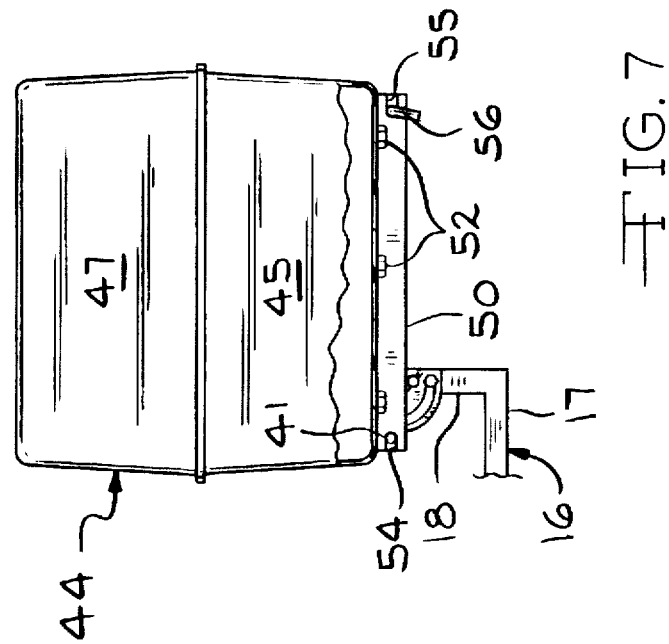
FIG. 7 is a side view of the cargo box mounted on the multifunctional hitch mounted carrying apparatus.

Referring to FIGS. 1 and 7, when the container 44 is the carrying accessory, the support frame 21 is placed in its horizontal locked position and the faces 53 of the angle brackets 50 are slid along the outer surfaces of the longitudinal members 22 of the support frame 21 until the retainer pins 41 are received in the slots 54. When this occurs, the rearward slots 55 are aligned with the openings 42 defined in the longitudinal members 22 of the support frame 21. Standard locking pins 56 are then inserted in the aligned slots 55 and the openings 42, to retain the container 44 on the support frame 21 of the multi-functional hitch carrying apparatus 15. While the container 44 is normally constructed of a plastic material, other materials such as metal or wood can also be utilized. The enclosed waterproof container 44 may be used to carry various items, such as suitcases, clothing, tools, fishing tackle and the like. In a similar manner, an animal transport kennel or a flat hauling deck may also be mounted on the horizontal support frame 21.

A flat hauling deck 60 is depicted in FIG. 8. The deck 60 is preferably made from metal with the frame being tubular to provide strength. The deck itself may be constructed of expanded metal or textured metal sheets or even from a plastic material. Again, the angle brackets 50 are attached or welded to the bottom of the metal deck 60 and are attached to the support frame 21 in the same manner as was the container 44, described above. Other commercially available hitch mounted carrying accessories can be easily adapted for use on the support frame 21 by first attaching a pair of the first-type attachment angle brackets 50.

Figure 5:
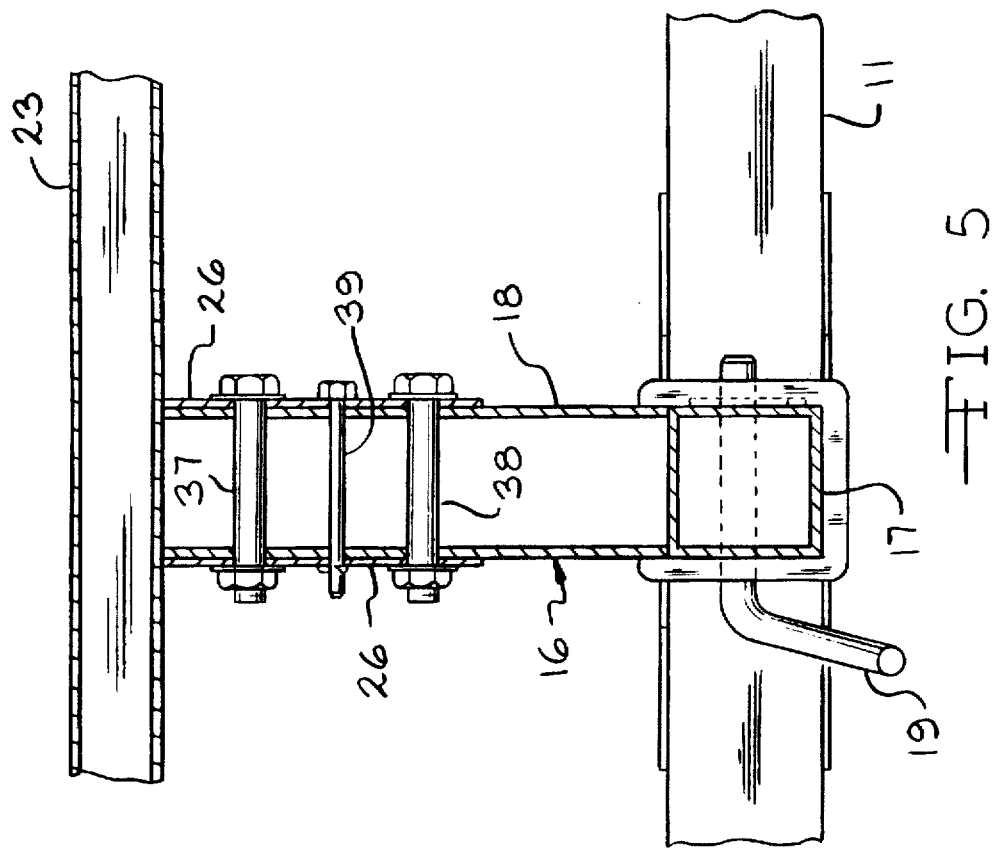
FIG. 5 is a sectional view taken along the line 5—5 of FIG. 2.

Referring to FIGS. 2, 2A and 5, a second type of attachment bracket is preferably used for vertical carrying accessories. As noted above, vertical carrying accessories may be, for examples ski racks, bicycle racks or spare tire holders. The support frame 21 is initially moved to its vertical position and the locking pin 39 inserted in the aligned openings 30 defined in the hinged plates 26 and through 5 openings 34 in the leg 18. A second type of attachment bracket 62 is utilized.

The attachment brackets 62 are generally U-shaped and define aligned pairs of openings 63 and 64. Referring to FIG. 4, the transverse cross member 24 defines holes 66. The attachment bracket 62 is 10 positioned on the transverse cross member 24 such that the openings 63 and 64 are aligned with the holes 66. Removable pins 68 extend through the aligned openings 63, 64 and 66 to secure the attachment bracket 62 to the transverse cross member 24 of the support frame 22.

While in the present embodiment, the attachment bracket 62 is generally "U-shaped", it is possible to use brackets of other configurations, such as angle brackets. In FIG. 2, a bicycle rack carrying accessory 70 is shown. A pair of parallel bicycle arms 71 are attached to and extend outwardly from a second type attachment bracket 62. The parallel bicycle arms are used to support a bicycle in a normal fashion. Similarly, ski rack arms and spare tire holders are also mounted on the second type attachment brackets 62 when required.

Many revisions may be made to the above described embodiments without departing from the scope of the invention or from the following claims.

We claim:

1. A hitch mounted multipurpose carrying apparatus for connecting to a vehicle, comprising a hitch member for connection to a vehicle hitch positioned rearwardly in the center rear of the vehicle along the transverse axis of the vehicle and a bumper positioned along the rear of the vehicle, said vehicle hitch having a center standard receiver opening, a multipurpose mounting platform connected to the hitch member, said hitch member adapted to be positioned within said center standard receiver opening, said hitch member comprising a one-piece L-shaped tubular member having a substantially horizontal first leg for connection to said vehicle hitch and a second substantially vertical leg extending upwardly from and substantially planar with said first leg such that an upper end of said second leg lies at a level proximate to the level of the vehicle bumper, said multipurpose mounting platform pivotably mounted to said second leg below the upper end thereof for carrying an accessory, said mounting platform being mounted at an elevation higher than said first leg, whereby a user can connect the carrying apparatus without crawling under said vehicle hitch or said carrying apparatus, said mounting platform pivoting between a vertical position and a horizontal position and lock means for selectively securing said mounting platform in either a fixed vertical accessory position or a fixed horizontal accessory position, and attachment means for removably attaching cargo carrying accessories to said mounting platform.

2. A hitch mounted multipurpose carrying apparatus, according to claim 1, wherein said second leg extends generally perpendicularly to said first leg.

3. A hitch mounted multipurpose carrying system, according to claim 1, wherein said hitch member is constructed of metal tube having generally rectangular cross-section.

4. A hitch mounted multipurpose carrying apparatus, according to claim 1, wherein said multipurpose mounting platform includes a transverse cross member, a pair of hinge plates mounted on said transverse cross member, said pair of hinge plates receiving said hitch member and a pivot pin connecting said second leg to said hinge plates.

5. A hitch mounted multipurpose carrying apparatus, according to claim 1, wherein said multipurpose mounting platform includes a pair of spaced, parallel longitudinal members and a pair of transverse cross members mounted between said longitudinal members.

6. A hitch mounted multipurpose carrying system, according to claim 5, wherein said longitudinal members and said cross members form a generally rectangular support frame.

7. A hitch mounted multipurpose carrying apparatus, according to claim 5, wherein said longitudinal members and said cross members are constructed of metal tubes having a generally rectangular cross section, at least one hinge plate extending from one of said transverse cross members adjacent said hitch member and a pivot pin connecting said hitch member to said at least one hinge plate.

8. A hitch mounted multipurpose carrying apparatus, according to claim 1, including first and second type attachment means for connecting an accessory to said multipurpose mounting platform, said first type attachment means comprising a pair of spaced parallel brackets for connection to the accessory, said multipurpose mounting platform and said parallel brackets having complementary connector means for removably attaching said accessory to said multipurpose mounting platform.

9. A hitch mounted multipurpose carrying apparatus, according to claim 1, including first and second type attachment means for connecting an accessory to said multipurpose mounting platform, said second type attachment means comprising an attachment bracket attachable on the accessory which is removably attached to said multipurpose mounting platform.

10. A hitch mounted multipurpose carrying apparatus, according to claim 9, wherein said attachment bracket is generally U-shaped or L-shaped.

11. A hitch mounted carrying apparatus, according to claim 1, wherein said multipurpose mounting platform includes a transverse cross member, a pair of hinge plates mounted on said transverse cross member, said pair of hinge plates defining an opening for receiving said second leg of said hitch member, a pivot pin extending between said pair of hinge plates operatively connecting said second leg of said hitch member to said mounting platform, said lock means including, a first pair of lock holes defined by said pair of hinge plates, a second pair of lock holes defined by said pair of hinge plates and a removable lock pin insertable in one of said first and second pairs of lock holes for securing said mounting platform in a fixed vertical accessory position or a fixed horizontal accessory position.

12. A hitch mounted carrying apparatus, according to claim 11, wherein each of said pair of hinge plates define an arcuate guide slot and a guide pin positioned in said arcuate guide slot and extending between said pair of hinge plates.

* * * * *